(12) United States Patent
Barbier et al.

(10) Patent No.: US 8,253,090 B2
(45) Date of Patent: Aug. 28, 2012

(54) IMAGE SENSOR WITH MULTIPLE INTEGRATION PERIODS

(75) Inventors: Frédéric Barbier, Grenoble (FR); Benoît Deschamps, Sassenage (FR)

(73) Assignee: STMicroelectronics S.A., Montrouge (FR)

( * ) Notice: Subject to any disclaimer, the term of this patent is extended or adjusted under 35 U.S.C. 154(b) by 523 days.

(21) Appl. No.: 12/273,164

(22) Filed: Nov. 18, 2008

(65) Prior Publication Data

US 2009/0127438 A1  May 21, 2009

(30) Foreign Application Priority Data

Nov. 20, 2007 (EP) .................................. 07301561

(51) Int. Cl.
*H01L 27/00* (2006.01)
(52) U.S. Cl. .................................................. 250/208.1
(58) Field of Classification Search ............... 250/208.1, 250/214 R; 348/297–299, 302, 308
See application file for complete search history.

(56) References Cited

U.S. PATENT DOCUMENTS

| | | | | |
|---|---|---|---|---|
| 5,329,372 A | * | 7/1994 | Nakamura | 348/302 |
| 5,962,844 A | * | 10/1999 | Merrill et al. | 250/214 A |
| 6,018,365 A | * | 1/2000 | Merrill | 348/302 |
| 2007/0097240 A1 | | 5/2007 | Egawa et al. | |

OTHER PUBLICATIONS

Y. Egawa et al., "A 1/2.5 inch 5.2Mpixel, 96dB Dynamic Range CMOS Inage Sensor with Fixed Pattern Noise Free, Double Exposure Time Read-Out Operation", Nov. 13-15, 2006, Proc. 2nd IEEE Asian Solid-State Circuits Conference, pp. 135-138.*

European Search Report dated Apr. 8, 2008 from European Patent Application No. 07 30 1561.2.

* cited by examiner

*Primary Examiner* — Georgia Y Epps
*Assistant Examiner* — Renee Naphas
(74) *Attorney, Agent, or Firm* — Wolf, Greenfield & Sacks, P.C.

(57) ABSTRACT

A method of reading voltages from an image sensor having an array of pixels, each pixel having at least one photodiode connectable to a storage node, the method having: controlling each pixel in a row of pixels to transfer charge accumulated in the photodiode above a first threshold to the storage node at the start and end of a first integration period and reading a first voltage at the storage node of each pixel in the row at the end of the first integration period; controlling of the pixels in the row to transfer charge accumulated in the photodiode above a second threshold to the storage node at the start and end of a second integration period longer than the first integration period, and reading a second voltage value at the storage node of each pixel in the row at the end of the second integration period; controlling each pixel in a row of pixels to transfer charge accumulated in the photodiode to the storage node at the end of a third integration period longer than the first and second integration periods; comparing for each pixel in the row, the first voltage values with a reference voltage; and based on the comparison, for each pixel in the row, performing one of: determining a pixel output value based on the first and/or second voltage values; and reading a third voltage value at the end of the third integration period, and determining a pixel output value based on the second and/or third voltage values.

12 Claims, 6 Drawing Sheets

IMAGE SENSOR WITH MULTIPLE INTEGRATION PERIODS

CROSS REFERENCE TO RELATED APPLICATIONS

This application claims the priority benefit of European patent application number 07301561.2, filed on Nov. 20, 2007, entitled "Image Sensor with Multiple Integration Periods," which is hereby incorporated by reference to the maximum extent allowable by law.

FIELD OF THE INVENTION

The present invention relates to an image sensor, and in particular to an image sensor with multiple integration periods and a method of operating the same.

BACKGROUND OF THE INVENTION

FIG. 1 illustrates a pixel 100 of a CMOS image sensor, which is generally known in the art as a 2T5 pixel, as it comprises five transistors and two photodiodes. This circuitry is, for example, described in IEEE publication titled "A ½.5 inch 5.2 Mpixel, 96 dB Dynamic Range CMOS Image Sensor with fixed Pattern Noise Free, Double Exposure Time Read-Out Operation", Yoshitaka Egawa et al.

Circuit 100 comprises photodiodes 101 and 102, connected between ground and first source/drain nodes of respective transistors 104 and 106, which have their second source/drain nodes connected to a node 107. Node 107 is connected to the gate of a transistor 108, which has one of its source/drain nodes connected to a column line 110, and its other source/drain node connected to a supply voltage via a transistor 112. A reset transistor 114 is provided connected between node 107 and the supply voltage.

Photodiodes 101 and 102 are reverse polarized, and their electrical behavior is similar to that of capacitors, allowing a voltage to be stored by them, which is discharged during an integration phase of the image sensor. Charges accumulated are then transferred to the parasitic capacitance of node 107, and the resulting voltage of node 107 can be read via column line 110, by activating transistor 112.

The operation of pixel 100 for capturing and reading image data from photodiode 101 as described by Egawa et al. will now be described with reference to the timing diagrams illustrated in FIG. 2.

Before the start of the integration phase, the reset signal RST is applied to reset the voltage at node 107 to the supply voltage. Signal TG1 at the gate of transistor 104 is then asserted high for a first pulse 201, for example to a voltage of 2.8 V, such that transistor 104 is turned on and photodiode 101 discharges any charge stored by it to the supply via transistors 104 and 114. The internal photodiode potential becomes the natural potential of the photodiode that results from doping, for example equal to around 1.5 V. At the start of an integration phase, TG1 returns low, as shown by falling edge 202 in FIG. 2. The reset transistor 114 remains on.

During the integration phase, electrical charges generated in the photodiode 101 reduce the photodiode voltage. After a determined time period, TG1 is asserted high for a second pulse 203, but to a lower voltage than the first pulse 201. The first pulse has a magnitude of 2.8 V and the second pulse 1.4 V. If the photodiode voltage has fallen during this time to a value below $1.4-V_{thTG}$, where $V_{thTG}$ is the threshold voltage of transistor 104, it will be increased again to this level. Otherwise, if it is higher than $1.4-V_{thTG}$, it will remain at the corresponding level. Because the reset transistor is still open, node 107 remains at the supply voltage.

At the falling edge of the second pulse, labelled 204 in FIG. 2, a short integration period starts, in which the photodiode voltage continues to fall due to charge generated by exposure to light of the photodiode. The signal RST is then lowered to isolate node 107 from the supply voltage. The short integration phase is ended by a third pulse 205 applied to TG1 having the same low amplitude as the second pulse 203, for example 1.4 V. Thus, if during the short integration phase the photodiode voltage has fallen to less than $1.4-V_{thTG}$, the voltage at node 107 will decrease accordingly, and the photodiode voltage will be returned to $1.4-V_{thTG}$. The voltage at node 107 is then read, as indicated by arrow L1 in FIG. 2, by activating transistor 112, such that the voltage is output on column line 110. This first voltage is digitalized into a 16-bit value.

Next, the voltage at node 107 is reset by activating and then deactivating the reset transistor 114, and a fourth pulse 207 is applied to TG1 having a high amplitude of 2.8 V. The voltage at node 107 is then altered by the total charge accumulated by the photodiode. After the falling edge of the fourth pulse, labelled 210 in FIG. 2, the voltage at node 107 is again read as indicated by arrow L2. Transistor 112 is activated and outputs the voltage at node 107 to column line 110. This voltage level is digitalized to generate a 16-bit value.

The two reads as described above are performed on each row of pixels of the image sensor, and are stored in memory. The memory required for this is therefore the memory that would normally store two rows of image data. If the reading at L1 is V1 and the reading at L2 is V2, the final output is then determined as the highest value between V1+V2 and V1($T_L/T_S$), where $T_L$ is the overall time duration of the long integration period and $T_C$ is the time duration of the short integration period, these values being illustrated in FIG. 2. White balance and color reconstruction are then performed, and then compression to generate a 12-bit value for each pixel.

The method proposed by Egawa et al. allows the dynamic range of the pixel to be increased by a certain extent using two digitalizations following two reads.

It would be desirable to provide an improved method and circuitry that increases the dynamic range of the image sensor further.

SUMMARY OF THE INVENTION

Embodiments of the present invention aim to at least partially address one or more needs in the art.

According to one aspect of the present invention, there is provided a method of reading voltages from an image sensor having an array of pixels, each pixel having at least one photodiode connectable to a storage node, the method comprising: controlling each pixel in a row of pixels to transfer charge accumulated in said photodiode above a first threshold to said storage node at the start and end of a first integration period and reading a first voltage at said storage node of each pixel in said row at the end of said first integration period; controlling of said pixels in said row to transfer charge accumulated in said photodiode above a second threshold to said storage node at the start and end of a second integration period longer than said first integration period, and reading a second voltage value at said storage node of each pixel in said row at the end of the second integration period; controlling each pixel in a row of pixels to transfer charge accumulated in said photodiode to said storage node at the end of a third integration period longer than said first and second integration periods; comparing for each pixel in said row, said first voltage values with a reference voltage; and based on said comparison, for each pixel in said row, performing one of: determining a pixel output value based on said first and/or second voltage values; and reading a third voltage value at the end of said third integration period, and determining a pixel output value based on said second and/or third voltage values.

According to an embodiment of the present invention, if said comparison indicates that charge was transferred from said photodiode to said storage node at the end of said first period, calculating said pixel output value as:

Pixel output value=MAX((L1+L2)×$G_C$;L1×$G_{TC}$)

where L1 is a value based on said first voltage value, L2 is a value based on second voltage value, $G_C$ is a gain based on the ratio between the durations of said third and second integration periods, and $G_{TC}$ is a gain based on the ratio between the durations of said third and first integration periods.

According to another embodiment of the present invention, if said comparison indicates that charge was not transferred from said photodiode to said storage node at the end of said first period, calculating said pixel output value as:

Pixel output value=MAX(L3+L2;L2×$G_C$)

where L3 is a value based on said third voltage value, L2 is a value based on said second voltage value, and $G_C$ is a gain value based on the ratio between the duration of said third and second integration periods.

According to another embodiment of the present invention, the voltage at said reference node is reset between the end of said second and third periods, but not between the ends of said first and second periods.

According to another embodiment of the present invention, the method further comprises controlling each of said pixels in said row to read a first reference voltage at said storage node before the end of said first period, wherein said comparison comprises comparing said first reference voltage with said first voltage value.

According to another embodiment of the present invention, transferring said charge at the end of said first, second and third periods comprises applying respective first, second and third voltage pulses to the gate of a transistor coupled between said photodiode and said storage node, the amplitude of said third voltage pulse being higher than the amplitude of said second voltage pulse, and the amplitude of said second voltage pulse being higher than the amplitude of said first voltage pulse.

According to another embodiment of the present invention, said first, second and third voltage pulses are triangular waves generated by charging and discharging a capacitance.

According to another aspect of the present invention, there is provided an image sensor comprising an array of pixels, each pixel comprising at least one photodiode connectable to a storage node, the image sensor further comprising: row control circuitry arranged to control each pixel in a row of pixels to transfer charge accumulated in said photodiode above a first threshold to said storage node at the start and end of a first period comprising a first integration period, to transfer charge accumulated in said photodiode above a second threshold to said storage node at the start and end of a second period comprising a second integration period, said second integration period being longer than said first integration period, and to transfer charge accumulated in said photodiode to said storage node at the end of a third period comprising a third integration period longer than said first and second integration periods; read circuitry arranged to read a first voltage at said storage node of each pixel in said row at the end of the first period and to read a second voltage value at said storage node of each pixel in said row at the end of the second period; a comparator arranged to compare, for each pixel in said row, the first voltage value with a reference voltage, and based on said comparison to control said read circuitry to read or not to read a third a third voltage value at said storage node of each pixel in said row at the end of the third period; and pixel output generating circuitry arranged to determine a pixel output value based on said first and/or second voltage values if no third voltage value is read by said read circuitry, or determine a pixel output value based on said second and/or third voltage values if said third voltage value is read by said read circuitry.

According to another embodiment of the present invention, said read circuitry comprises a first capacitor arranged to store said first voltage value, a second capacitor arrange to store said second voltage value, and a logic block arranged to over write said first voltage value in said first capacitor with said third voltage value based on an output of said comparator.

According to another embodiment of the present invention, each pixel comprises a transistor coupled between said photodiode and said storage node, and wherein said row control circuitry is arranged to apply triangular voltage pulses to a gate of said transistor to control said charge transfers, the row control circuitry comprising pulse generating circuitry comprising a capacitor and arranged to generate said triangular voltage pulses.

According to another aspect of the present invention, there is provided a mobile telephone and/or a digital camera comprising an image memory, a display and the above image sensor.

According to another aspect of the present invention, there is provided an image sensor comprising an array of pixels, each pixel comprising at least one photodiode connectable to a storage node in said pixel by a first transistor, and pulse generating circuitry coupled to a gate node of said first transistor of at least one of said pixels and arranged to apply a triangular pulse to said gate node, wherein said pulse generating circuitry comprises a capacitors and a switch controllable to charge said capacitor during a first time period to generate a rising edge of said triangular wave and to discharge, at the end of said first time period, said capacitor to generate a falling edge of said triangular wave, the amplitude of said triangular wave being controlled by the duration of said first period.

According to one embodiment, the pulse generating circuitry further comprises a timing block arranged to receive a signal indicating the desired amplitude of said triangular pulse, and to generate a timing pulse for controlling said switch having a width determined based on said desired amplitude.

According to a further aspect of the present invention, there is provided a method of generating a triangular pulse in an image sensor comprising an array of pixels, each pixel comprising a photodiode, a storage node, and a first transistor controllable to connect the photodiode to the storage node, wherein said triangular pulse is applied to a gate node of said first transistor, said method comprising:

determining a first time period based on a desired amplitude of said triangular pulse; and controlling a switch to charge a capacitor during said first time period to generate a rising edge of said triangular wave and, at the end of said first time period, to discharge said capacitor to generate a falling edge of said triangular wave.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION

Figure 3:
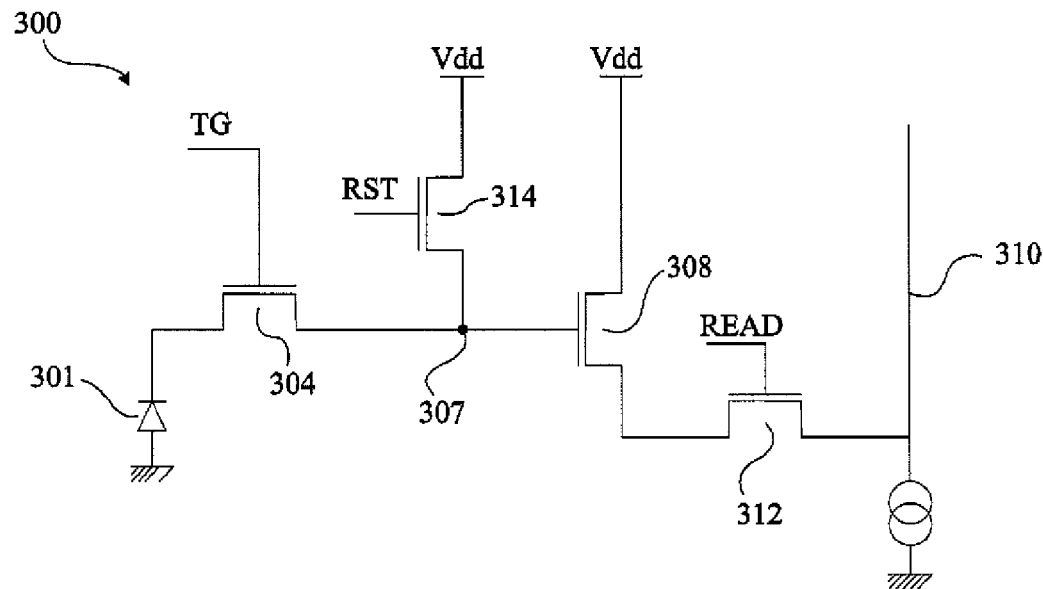
FIG. 3 illustrates a pixel structure used by embodiments of the present invention.

FIG. 3 illustrates a 4T pixel circuit comprising a photodiode 301, and four MOS transistors. Photodiode 301 is connected to a source/drain node of a transistor 304, which comprises a further source/drain node connected to a storage node 307 and is controlled by a signal TG. Node 307 is connected to the gate node of a transistor 308, which comprises a first source/drain node connected to a supply voltage, and a second source/drain node connected to a column line 310 via a read transistor 312. Transistor 312 is controlled by a read signal READ. Node 307 is also connected to the supply voltage via a reset transistor 314, which is controlled by a reset signal RST.

Operation of pixel circuit 300 is very similar to that of pixel circuit 100 described above. In particular, as with photodiodes 101 and 102, photodiode 301 is reverse polarized and has an electrical behavior similar to that of a capacitor, allowing a voltage to be stored, which is discharged during an integration phase in which image data is captured by the image sensor. Charges accumulated are then transferred to the parasitic capacitance of node 307, and the voltage level at node 307 can be read via column line 310 by activating transistor 312.

Figure 1:
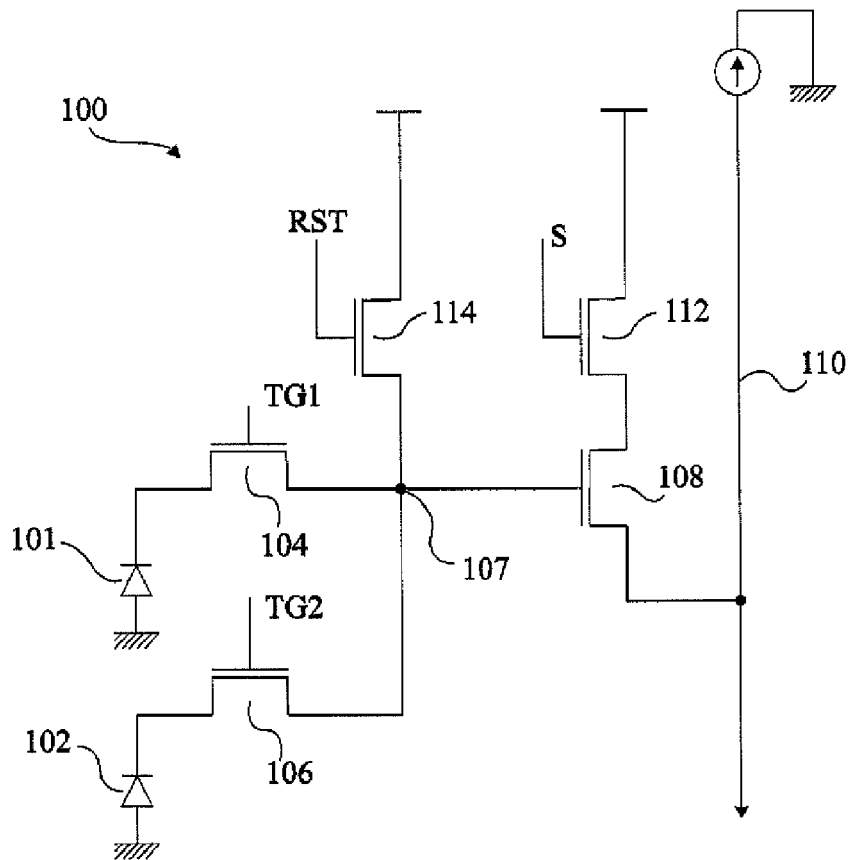
FIG. 1 (described above) illustrates a known pixel circuit.
Figure 2:
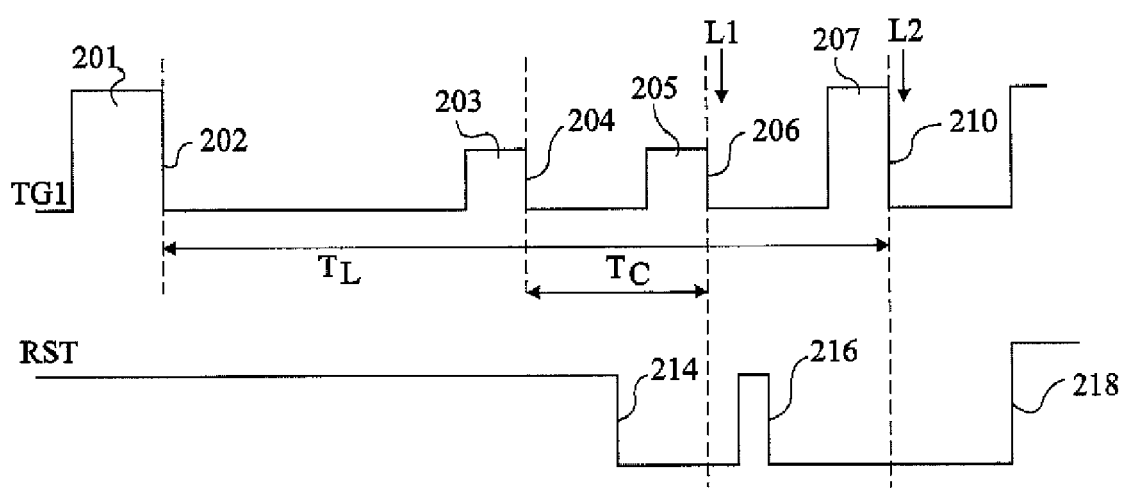
FIG. 2 (described above) shows timing diagrams of control signals applied to the pixel circuit of FIG. 1, according to a known method.

A method for controlling and reading integration voltages from an image sensor comprising an array of the 4T pixel circuits 300 of FIG. 3 will now be described with reference to FIGS. 4 and 5A to 5C. It will be apparent to those skilled in the art that the method may be applied to any pixel circuit having a transfer gate transistor, such as transistors 104 and 304, for transferring charge from the photodiode to a storage node, for example such as the 2T5 pixel circuit of FIG. 1, or a 1T75 pixel circuit.

Figure 4:
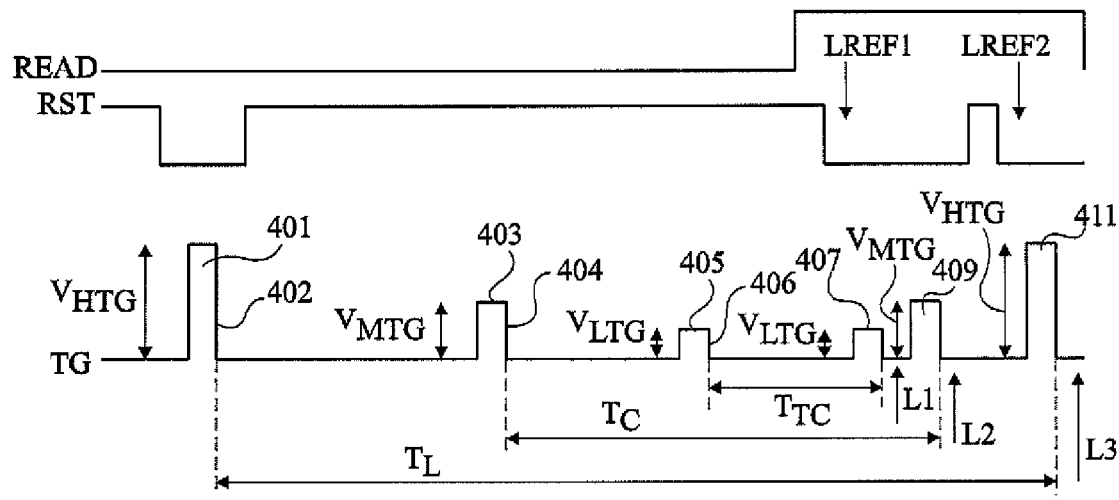
FIG. 4 shows timing diagrams of control signals applied to the circuit of FIG. 3 according to an embodiment of the present invention.

FIG. 4 shows timing diagrams for the signal READ applied to the gate of transistor 312, the reset signal RST applied to the gate of the reset transistor 314, and the signal TG applied to the gate of transistor 304.

As illustrated in FIG. 4, the signal TG in this example comprises a total of six pulses during an integration/read cycle, and controls each pixel in an image sensor to have three integration periods of varying length, a long integration period $T_L$, a short integration period $T_C$, and a very short integration period $T_{TC}$.

Initially, the READ signal is low, and the RST signal is high, resetting node 307 to the supply voltage Vdd, which is for example at 2.7 V. RST is then brought low, and a first pulse 401 is applied to TG. Pulse 401 has an amplitude of $V_{HTG}$, which is for example equal to 3.3 V. This pulse initializes the photodiode voltage by discharging any charges stored in the photodiode to the supply voltage via transistors 304 and 314. The internal voltage of the photodiode becomes its natural potential resulting from doping, for example approximately 1.5 V. At the falling edge 402 of this pulse, the long integration period $T_L$ starts.

Before a second pulse 403 is applied to TG, the reset signal RST is asserted again. The second pulse 403 is applied a certain time after the first pulse 401, and has an amplitude of $V_{MTG}$, which is lower than $V_{HTG}$. $V_{MTG}$ is for example equal to 1.0 V. At the second pulse, if the photodiode voltage has fallen below a voltage level $V_{MD}$, which is equal to $V_{MTG}-V_{thTG}$, where $V_{thTG}$ is the threshold voltage of transistor 304, charge will be skimmed from the photodiode to node 307 until the photodiode voltage has increased to $V_{MD}$. Otherwise, no charge will be skimmed. Transistor 304 is for example a natural MOS transistor having a very low threshold voltage. Assuming $V_{thTG}=0.1$ V, $V_{MD}$ is for example equal to approximately 0.9 V. Given that the storage node 307 is connected by the reset transistor 314 to Vdd, any charge transferred from the photodiode will go to the supply voltage. The falling edge 404 of pulse 403 determines the start of the short integration period $T_C$.

A third pulse 405 is applied to TG a certain after the second pulse 403, and has an amplitude of $V_{LTG}$, which is lower than $V_{MTG}$, and for example equal to 0.6 V. At the third pulse 405, if the photodiode voltage has fallen below a voltage level $V_{LD}$, which is equal $V_{LTG}-V_{thTG}$, charge will be skimmed from the photodiode to node 307 until the photodiode voltage has increased to $V_{LD}$. Otherwise, no charge will be skimmed. $V_{LD}$ is for example equal to approximately 0.5 V. Given that the storage node 307 is connected by the reset transistor 314 to Vdd, any charge transferred from the photodiode will go to the supply voltage. The falling edge 406 of pulse 403 determines the start of the very short integration period $T_{TC}$.

Before transferring and reading the voltages accumulated during the integration periods $T_L$, $T_C$ and $T_{TC}$, the read signal READ is asserted to connect node 307 to the output line 310, and then the reset signal RST is brought low to isolate node 307 from the supply voltage Vdd. A read $L_{REF1}$ is then performed to provide a reference voltage $V_{REF1}$ from which voltage changes at node 307 at L1 and L2 can be measured.

A fourth pulse 407 is then applied to TG having amplitude $V_{LTG}$, which has the same effect as the third pulse 405, skimming charge to node 307 if the photodiode voltage has fallen below $V_{LD}$. If charge was skimmed at the third pulse 405, the charge skimmed at the fourth pulse 407 will equal the charge accumulated during the very short integration period $T_{TC}$, else any skimmed charge will equal charge accumulated during the short period TC. The voltage $V_{L1}$ at node 307 is then read as shown by arrow L1 in FIG. 4, by sampling circuitry arranged to sample the voltage on output line 310.

A fifth pulse 409 is then applied to TG having amplitude $V_{MTG}$, which has the same effect as the second pulse 403, skimming charge to node 307 if the photodiode voltage has fallen below $V_{MD}$. If charge was skimmed at the second pulse 403, the charge skimmed at the fifth pulse 409 will equal the charge accumulated during the short integration period $T_C$, else any skimmed charge will equal charge accumulated during the long integration period $T_L$. It should be noted that as no reset is performed between L1 and L2, the value read at L2 is equal the value stored at L1 plus any additional charge skimmed between L1 and L2. The voltage $V_{L2}$ at node 307 is then read as shown by arrow L2 in FIG. 4 1 by sampling circuitry arranged to sample the voltage on output line 310.

The reset signal RST is then applied to reset the voltage at node 307. A read $L_{REF2}$ is then be performed to provide a second reference voltage $V_{REF2}$ from which voltage changes at node 307 at read L3 can be measured.

A sixth pulse 411 is then applied to TG having amplitude $V_{HTG}$, which, like the first pulse 401, transfers all charge stored in the photodiode to node 307. If no charge was skimmed at the fourth or fifth pulses 407 and 409, the charge transferred during the sixth pulse will be charge accumulated during the long integration period $T_L$. The third read L3 is performed in cases that no charge is transferred to the storage node 307 from the photodiode by the fourth pulse 407, as determined by a comparison between $V_{REF1}$ and $V_{L1}$. If $V_{REF1}$-$V_{L1}$<threshold, where threshold is a low value, the voltage $V_{L3}$ at node 307 is read as shown by arrow L3 in FIG. 4, by sampling circuitry arranged to sample the voltage on output line 310. Otherwise, no further read is made. Finally, the read signal READ is brought low after the final read L3.

Figure 5A:
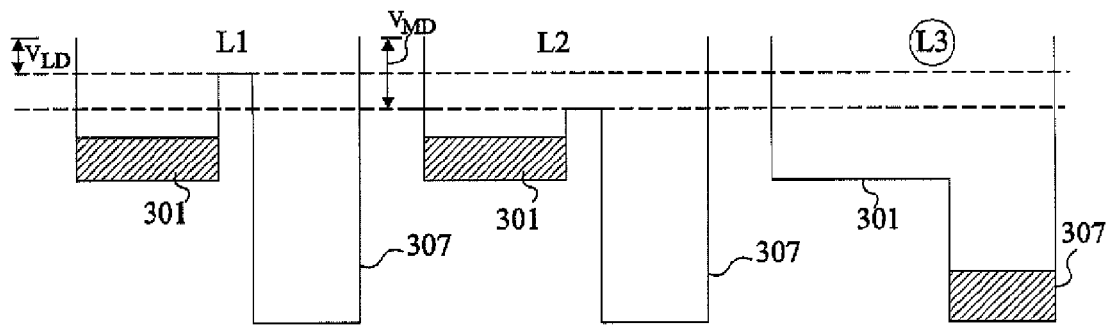
FIGS. 5A to 5C schematically illustrate charge transfer from a photodiode to a storage node of FIG. 3 according to an embodiment of the present invention.
Figure 5B:
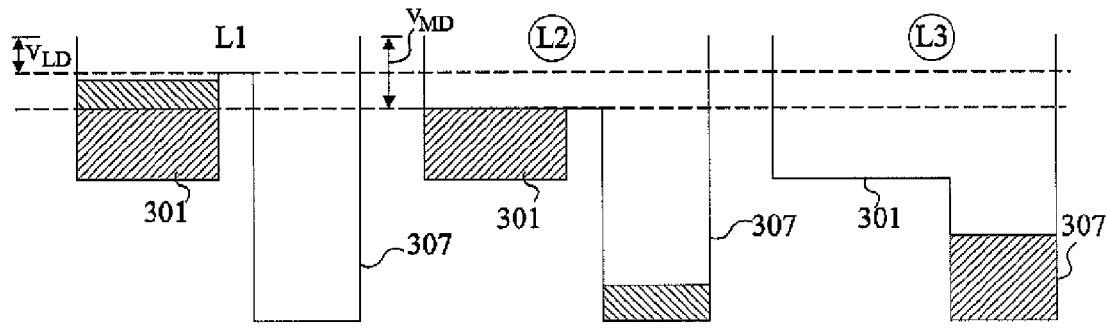
Figure 5C:
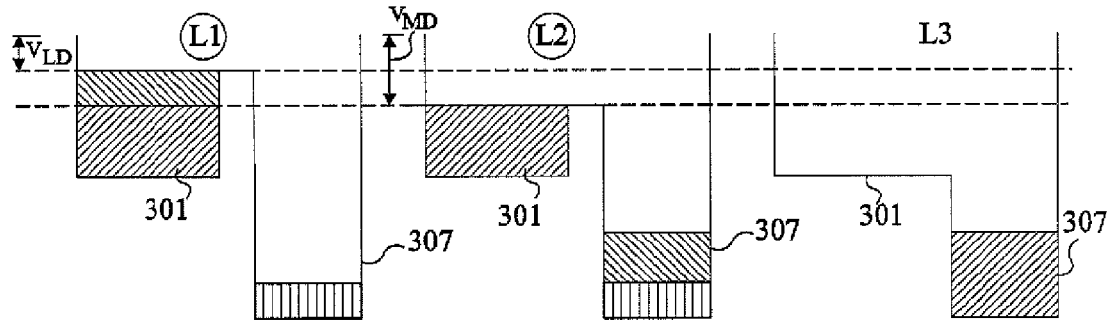

FIGS. 5A, 5B and 5C illustrate schematically charge accumulated by the photodiode 301 and transferred to the storage node 307 at the first, second and third reads L1, L2 and L3, in the case of low illumination, medium illumination and high illumination respectively.

As shown in FIG. 5A, in the case that the illumination is low, at the first and second reads L1 and L2, no charge has been transferred, and thus the voltage at node 307 will show no significant voltage change with respect to the reference voltage $V_{REF1}$ and in this case both L2 and L3 are performed. At L3, the charge accumulated during the long integration period $T_L$ has been transferred to node 307, and this value provides the pixel output.

As shown in FIG. 5B, in the case that the illumination is medium, at the first read L1, no charge has been transferred, and thus this value will show no voltage change with respect to the reference voltage read at $L_{REF1}$. As explained above, in this case reads at both L2 and L3 are performed. At L2, charge has been transferred and thus the voltage read at node 307 is non-zero. At L3, the remaining charge in the photodiode has been transferred. The pixel output in this case is equal to:

$$\text{MAX}(V_3+V_2; V_2 \times G_C)$$

where $V_3$=$V_{REF2}$-$V_{L3}$, $V_2$=$V_{REF1}$-$V_{L2}$, $G_C$ is a gain determined as $T_L/T_C$.

As shown in FIG. 5C, in the case that the illumination is high, charge has been transferred at the first and second reads L1 and L2. Because no reset is performed between L1 and L2, the total charge transferred to node 307 at L2 is the charge transferred at L1 plus the additional charge skimmed by pulse 409 just before L2. In this case, the pixel output is determined as:

$$\text{MAX}((V1+V2) \times G_C; V1 \times G_{TC})$$

where V2 and $G_C$ are the same as is formula (1), V1=$V_{REF1}$-$V_{L1}$, and $G_{TC}$ is a gain equal to $T_L/T_{TC}$. As the value read at L1 is non-zero, no read is performed at L3.

Figure 6:
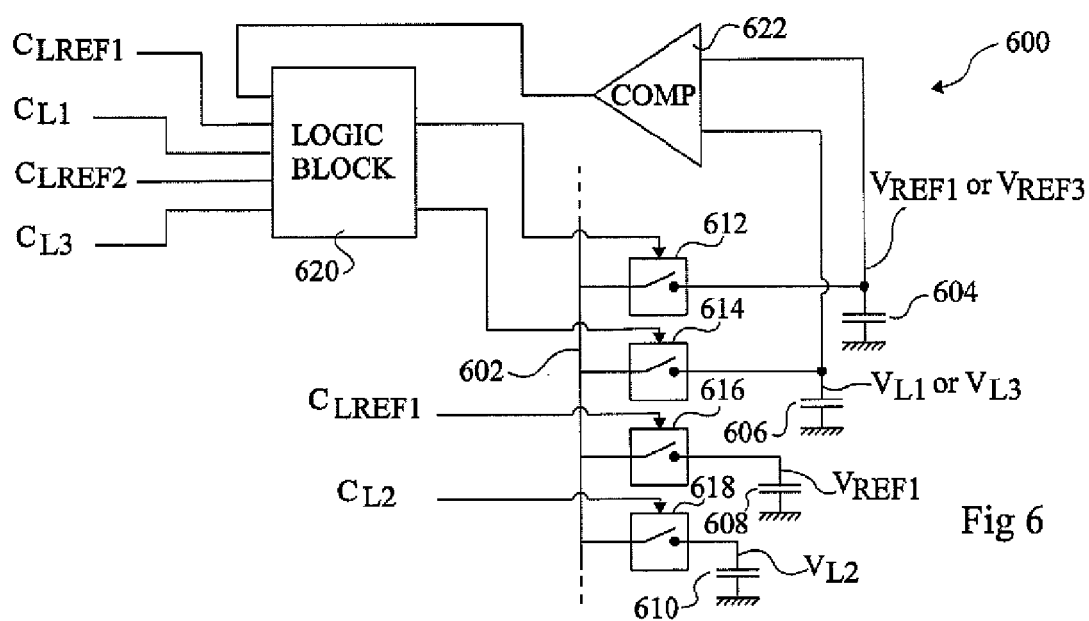
FIG. 6 illustrates read circuitry for reading and storing pixel values from a pixel according to an embodiment of the present invention.

FIG. 6 illustrates sampling circuitry 600 associated with one pixel column line 602, for sampling the voltages at node 307 to perform the reads $L_{REF1}$, $L_{REF2}$, L1, L2 and L3. Four capacitors 604, 606, 608 and 610 are provided, connectable to the pixel line via respective logic gates 612, 614, 616 and 618. Logic gates 612 and 614 are controlled by a logic block 620, which receives four timing signals, signals $C_{L1}$ and $C_{L3}$ for timing reads at L1 and L3 respectively, and signals $C_{LREF1}$ and $C_{LREF2}$ for timing $L_{REF1}$ and $L_{REF2}$ respectively. The values stored by capacitors 604 and 606 are provided to a comparator 622, which outputs a signal to logic block 620. Logic gate 616 is controlled by a timing signal $C_{LREF1}$ for controlling when read $L_{REF1}$ occurs, and logic gate 618 is controlled by a signal $C_{L2}$, for controlling when the second read L2 occurs.

In operation, logic block 620 passes the signals $C_{LREF1}$ and $C_{L1}$ to logic gates 612 and 614, which are thereby activated to read signals $V_{REF1}$ and $V_{L1}$ at the corresponding times shown in FIG. 4, and these values are stored by capacitors 604 and 606 respectively. Then signal $C_{L2}$ activates logic gate 618 to read $V_{L2}$ at the corresponding times shown in FIG. 4. Comparator 622 compares the values from capacitors 604 and 606, and if $V_{REF1}$-$V_{L1}$<threshold, where threshold is a low value, this indicates that no skimming took place, and the output of comparator 622 controls logic block 620 to pass timing signals $C_{LREF3}$ and $C_{L3}$ to logic gates 612 and 614, to read $V_{REF3}$ and $V_{L3}$ at the corresponding time shown in FIG. 4, and these values are written to capacitors 612 and 614, overwriting the values relating to the first read. Otherwise, if $V_{REF1}$-$V_{L1}$>threshold, this indicates that no third read is to take place. $V_1$ is calculated as $V_{REF1}$-$V_{L1}$, $V_2$ as $V_{REF1}$-$V_{L2}$, and $V_3$ as $V_{REF2}$-$V_{L3}$.

Digitalization of the voltage $V_2$ is always performed. $V_1$ or $V_3$ is digitalized depending on whether the values finally stored by capacitors 604 and 606 relate to $V_1$ or $V_3$. Thus only two digitalizations are performed according to the present method.

FIGS. 7A to 7E are graphs illustrating examples of the calculation of the pixel output voltage based on values of L1, L2 and/or L3 according to five possible cases. Dashed lines labelled $V_{MS}$ in each graph show the medium skimming threshold in the photodiode above which accumulated charge is skimmed when $V_{MTG}$ is applied to transistor 304. This threshold is determined by:

$$V_{MS}=V_i-V_{MD}$$

where $V_i$ is the initial photodiode voltage after reset, for example equal to 1.5 V, and $V_{MD}$ is equal to $V_{MTG}$-$V_{thTG}$. Dashed lines labelled $V_{LS}$ in each graph show the low skimming threshold in the photodiode above which accumulated charge is skimmed when $V_{LTG}$ is applied to transistor 304. This threshold is determined by:

$$V_{LS}=V_i-V_{LD}$$

where $V_i$ is as above, and $V_{LD}$ is equal to $V_{LTG}$-$V_{thTG}$.

Figure 7A:
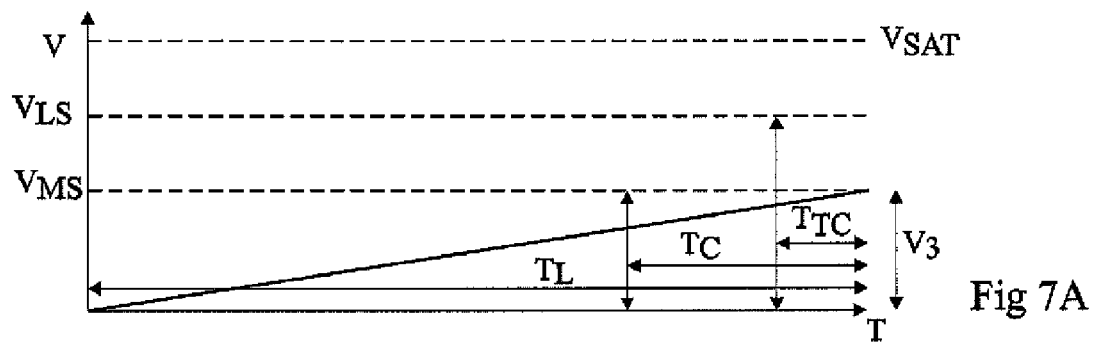
FIGS. 7A to 7E are graphs illustrating the relationship between integration times and the voltages read during integration periods for generating an image value.

FIG. 7A shows a first case in which during the long integration period, the charge in the photodiode does not reach the medium skimming threshold $V_{MS}$. In this case the voltage $V_3$ alone is used to determine the pixel output.

Figure 7B:
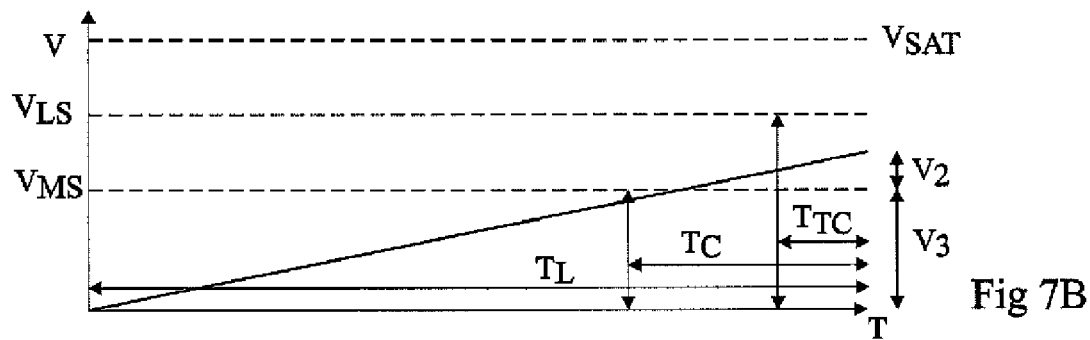

FIG. 7B illustrates the next case in which the medium skimming threshold $V_{MS}$ is exceeded in the long integration period $T_L$, but not before the start of the short integration period $T_C$. In this case no charge is skimmed, and the pixel output is determined as $V_3+V_2$.

Figure 7C:
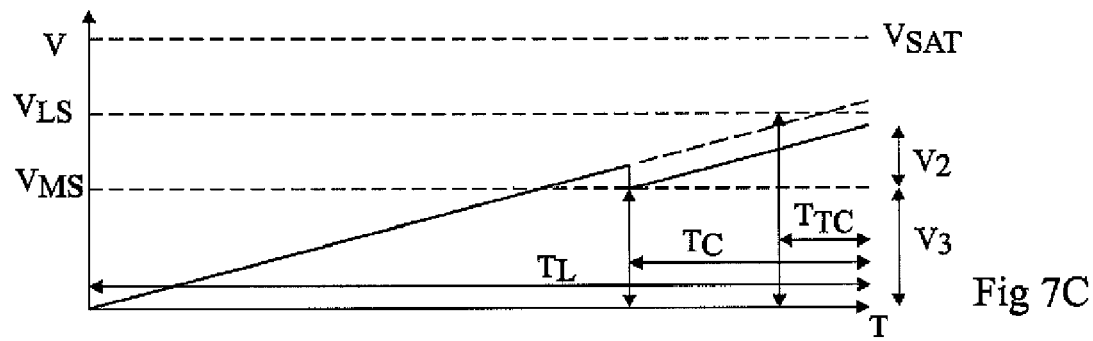

FIG. 7C illustrates the case in which the medium skimming threshold $V_{MS}$ is exceeded before the start of the short integration period $T_C$, and thus charge is skimmed at the start of the short integration period $T_C$. The low skimming threshold $V_{LS}$ is not reached by the start of the very short integration period $T_{TC}$. The pixel output is determined as $V_2 \times G_C$, where $G_C$ is equal to the ratio $T_L/T_C$.

Figure 7D:
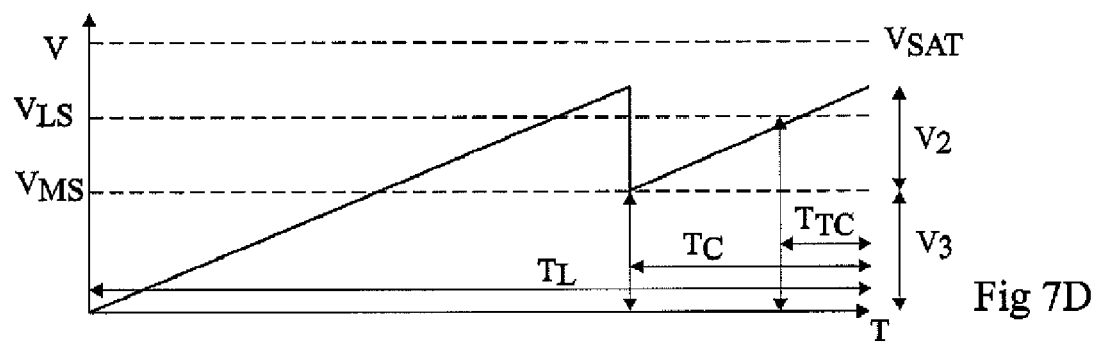

FIG. 7D illustrates the case in which the low skimming threshold $V_{LS}$ is exceeded before the start of the short integration period $T_C$, and charge is skimmed, but the low skimming threshold is not exceeded before the start of the very short integration period. In this case, the pixel output is determined as $V_2 \times G_C$, where $G_C$ is equal to the ratio $T_L/T_C$.

Figure 7E:
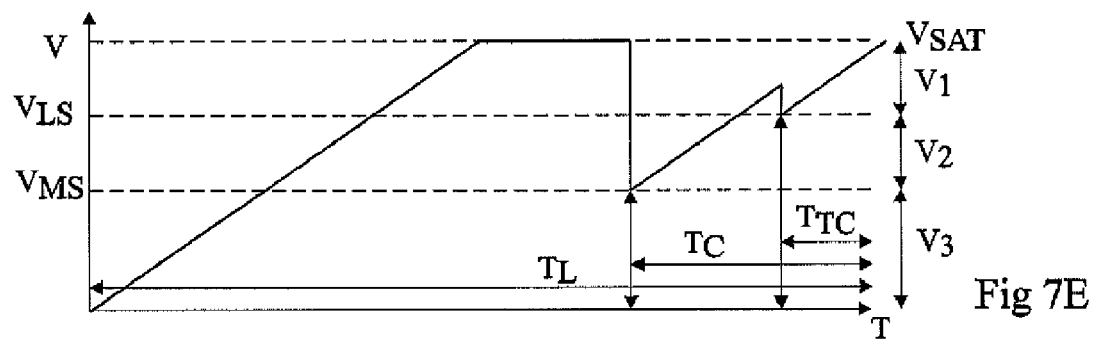

FIG. 7E illustrates the case in which saturation of the pixel is reached before the start of the short integration period $T_C$, and the low skimming threshold is reach before the start of the very short integration period $T_{TC}$, such that skimming occurs both at the start of the short and very short integration periods. In this case, the output is calculated as $L1 \times G_{TC}$, where $G_{TC}$ is equal to the ratio $T_L/T_{TC}$.

Figure 8:
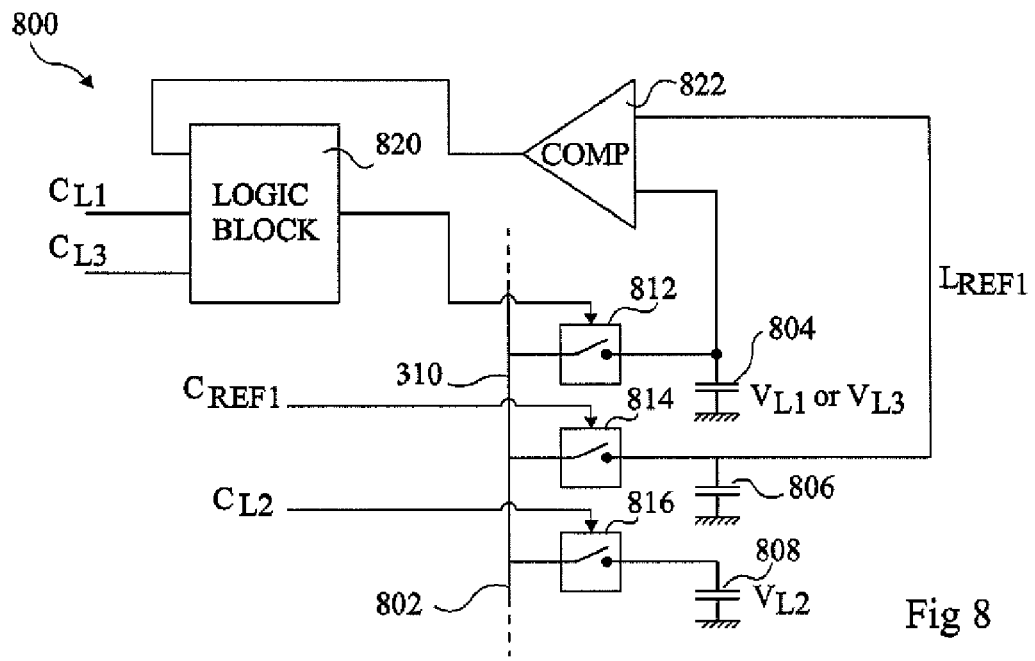
FIG. 8 illustrates read circuitry for reading and storing pixel values from a pixel according to another embodiment of the present invention.

FIG. 8 illustrates alternative sampling circuitry 800, comprising three capacitors 804, 806 and 808. In this embodiment, only capacitor 814 is used to store a reference value, and stores $V_{REF1}$ read at $L_{REF1}$. Comparator 822 compares voltage $V_{L1}$ stored by capacitor 804 with $V_{REF1}$ stored by capacitor 806, and the output of comparator 822 is provided to logic block 820. Logic block 820 receives signals CL1 and CL3 for time the first and second reads L1 and L3, and controls logic gate 812 to store $V_{L3}$ on capacitor 804 if the output of comparator 822 indicates that at L1 no charge has been transferred to node 307.

According to this alternative embodiment, the voltage at node 307 is not reset between the reads at L2 and L3 of FIG. 4, and thus the value read at L3 is equal to the values read at L1 and L2 plus additional charge transferred from the photodiode in response to the fifth pulse 409 of FIG. 4. This changes the calculation of the pixel output in the case that $V_1$ is zero and $V_2$ is non-zero, and in this case the output is determined as:

$$MAX(V_3; V_2 \times G_C)$$

An advantage of this solution is that the number of capacitors in the sampling circuitry can be reduced to three, as illustrated in FIG. 8.

Figure 9:
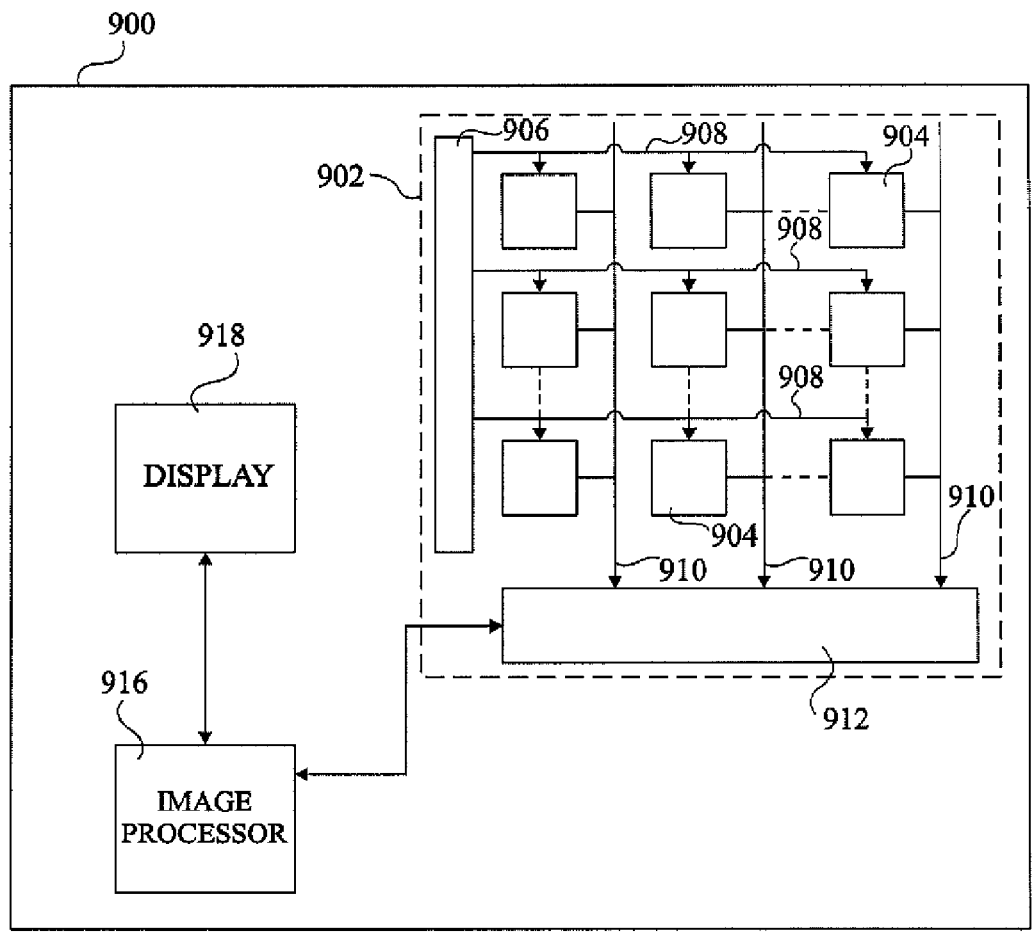
FIG. 9 illustrates an electronic device according to an embodiment of the present invention.

FIG. 9 illustrates an electronic device 900 comprising an image sensor 902 according to embodiments described herein. Image sensor 902 comprises an array of pixels 904, each for example comprising the pixel 100 or 300 of FIG. 1 or 3 respectively, or an alternative pixel structure. Row of pixels 904 are connected to row control circuitry 906 via row lines 908. Three rows of pixels and corresponding row lines are illustrated, although many more rows could be provided. Row control circuitry 906 provides the signals TG, READ and RST to each pixel.

Columns of pixels 904 are connected to column lines 910, which are connected to output circuitry 912. Three columns of pixels and corresponding column lines are illustrated, although many more may be provided. Output circuitry 912 comprising sampling circuitry, for example circuit 600 of FIG. 6 or circuit 800 of FIG. 8, as well as an ADC (analogue to digital converter) for digitizing sampled values, for example into 16 bits, and also circuitry for generating output pixel values based on the digitalized values, as explained above.

Pixel values output by the image sensor 902 are, for example, displayed by display 918. A memory (not shown) may be provided for storing images captured by the image sensor 902.

Device 900 is, for example, a mobile telephone, digital camera, PDA (personal digital assistant) or the like.

Figure 10:
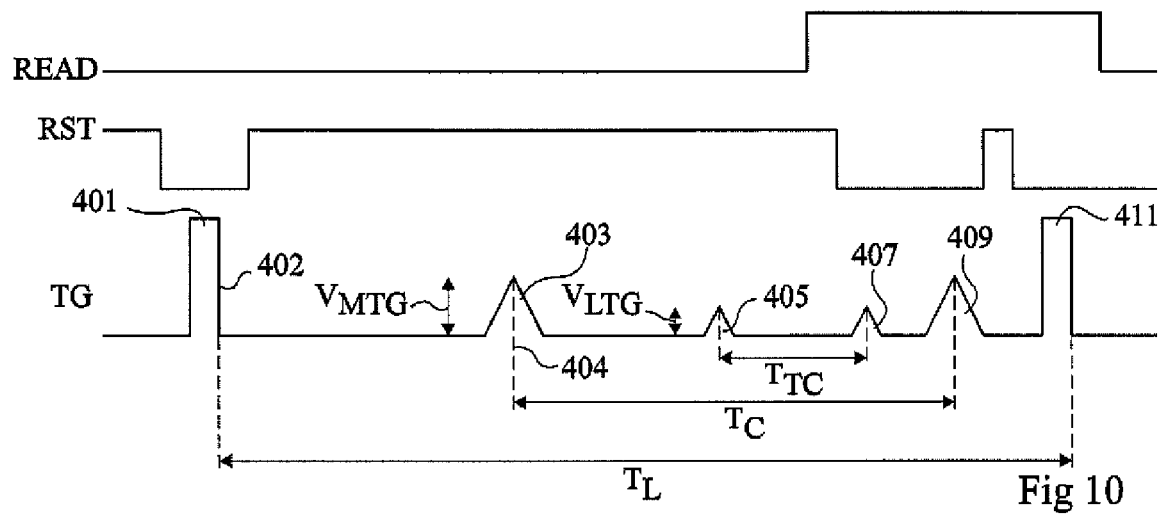
FIG. 10 illustrates timing diagrams of control signals applied to the circuit of FIG. 3 according to another embodiment of the present invention.

FIG. 10 shows timing diagrams for the signal READ applied to the gate of transistor 312, the reset signal RST applied to the gate of the reset transistor 314, and the signal TG applied to the gate of transistor 304 according to an alternative embodiment in which some of the pulses of TG are triangular waves rather than square waves. The read signal READ and reset signal RST are the same as previously, as are pulses 401 and 411 of TG. However, pulses 403 to 409 are provided as triangular waves. Pulses 403 and 409 have peaks of magnitude $V_{MTG}$, while pulses 405 and 407 have peaks of magnitude $V_{LTG}$. The generation of pulses having reduced magnitude is advantageously simplified by providing the pulses as triangular waves allowing the magnitude to be accurately controlled by simple circuitry, as will now be described in relation to FIG. 11.

Figure 11:
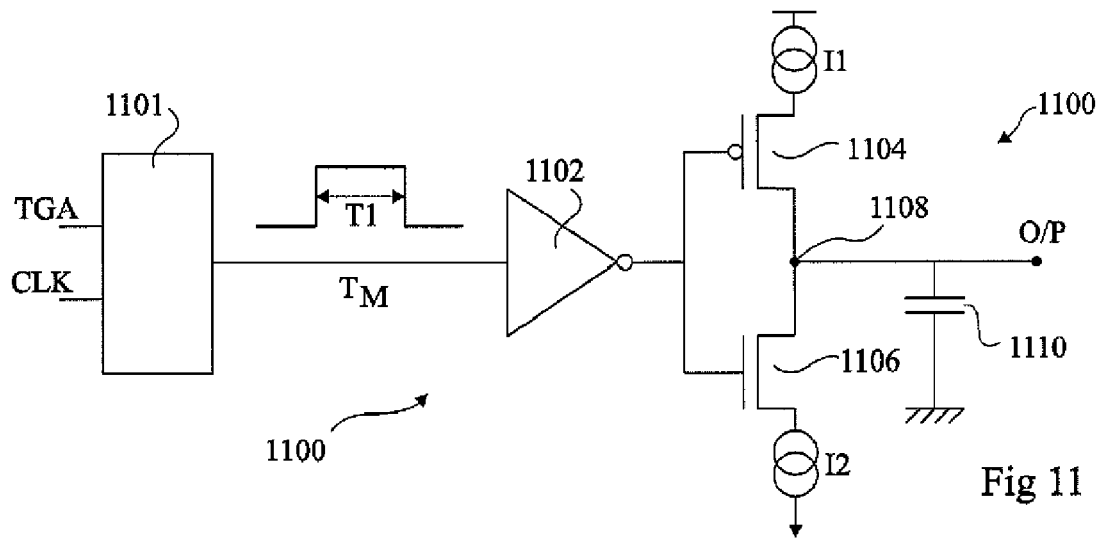
FIG. 11 illustrates triangular pulse generating circuitry according to an embodiment of the present invention.

FIG. 11 illustrates pulse generating circuitry 1100 for generating triangular pulses. As illustrated, a block 1101 receives a signal TGA, indicating, for example in digital form, the required amplitude of the triangular wave, and a clock signal CLK. Based on these inputs, block 1101 generates a timing signal $T_M$ comprises a pulse having a width $T_1$. This signal is provided to an inverter 1102, which in turn is connected to the gate of an n-channel MOS transistor 1104 and the gate of a p-channel MOS transistor 1106. Transistor 1104 has its source/drain terminals connected to a current source $I_1$ and to a node 1108, while transistor 1106 has its source/drain nodes connected to node 1108 and a current source I2. Node 1108 is connected to a grounded capacitor 1110 and to an output of the circuit.

In operation, the pulse width T1 of the square pulse of TM determines the magnitude of the triangular wave generated at node 1108. In particular, on the rising edge of pulse T1, transistor 1104 is activated and transistor 1106 is turned off, such that capacitor 1110 is charged by current I1. On the falling edge of T1, transistor 1104 is turned off, while transistor 1106 is activated, connecting node 1108 to current source I2, which discharges capacitor 1110. The current I1 determines the gradient of the rising edge of the triangular pulse, while the current I2 determines the gradient of the falling edge of the triangular pulse.

Advantages of the pulse generation circuitry of FIG. 11 are that no digital to analog circuitry is required to generate voltage levels, the circuit is very flexible allowing a large range of voltages to be generated. Furthermore timing is used to control the voltage level, which can be controlled precisely. This circuitry can be used for generating voltage levels for any pixel in which skimming is performed.

Figure 12:
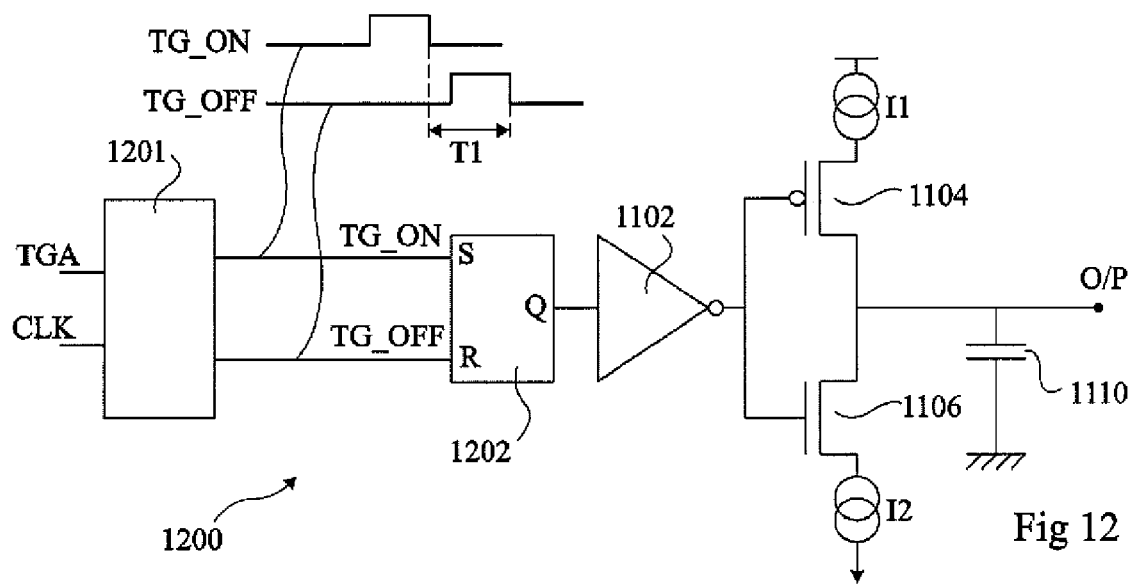
FIG. 12 illustrates triangular pulse generating circuitry according to an alternative embodiment of the present invention.

FIG. 12 illustrates pulse generating circuitry 1200 which comprises many of the same components as circuitry 1100, and like parts have been labelled with like reference numerals. Block 1101 of FIG. 11 has been replaced in FIG. 12 by a block 1201 which receives the same inputs TGA and CLK, but generates two output signals, TG_ON and TG_OFF. Circuitry 1200 additionally comprises a set-reset flip-flop 1202, which receives TG_ON at its S input and TG_OFF at its R input, and has its Q output connected to the input of inverter 1102. The charging period of capacitor 1110 is thus controlled by the period between the rising edges of TG_ON and TG_OFF.

Thus an image sensor and a method of controlling the same have been described in which the dynamic range of the sensor is extended by providing three or more integration periods of varying lengths, and reading and digitalizing voltages relating to charges accumulated during two of these integration periods for use in determining the pixel output value.

An advantage of the present method and image sensor is that an improved dynamic range can be achieved when compared with a system using just two different integration periods, while only two digitalizations are performed. In particular, while a typical dynamic range of a small pixel may be approximately 60 dB, using the multiple integration periods of the present invention, it has been found that this range can be extended to over 100 dB.

A further advantage of the present method and image sensor is that the same capacitor can be used for storing voltages relating to the longest and shortest integration periods, as only one of these voltages is stored and digitalized.

Furthermore, an advantage of the present method and image sensor is that fixed pattern noise (FPN) is eliminated for all light levels. Also, there is an improved distribution of the signal to noise ratio at high illumination. This is because by providing a greater number of integration periods, the mid-length integration periods can have lower gains associated with them when compared to the shortest integration period, and thus improved signal to noise ratio, when compared to systems with just two integration periods.

Having thus described at least one illustrative embodiment of the invention, various alterations, modifications and improvements will readily occur to those skilled in the art.

For example, generation of the pixel values can be performed in hardware, software, or a combination of both. It will be apparent that while examples of the timing of control signals have been provided, many modifications can be made, while keeping the advantages of the invention.

While circuits comprising three integration periods of different durations have been described, in alternative embodiments, a greater number of integration periods could be provided, and more comparisons used to determine on which integration period or periods the pixel out voltage should be based.

What is claimed is:

1. A method of reading voltages from an image sensor comprising an array of pixels, each pixel having at least one photodiode connectable to a storage node, the method comprising:

controlling each pixel in a row of pixels to transfer charge accumulated in said photodiode above a first threshold to said storage node at the start and end of a first integration period and reading a first voltage at said storage node of each pixel in said row at the end of said first integration period;

controlling each of said pixels in said row to transfer charge accumulated in said photodiode above a second threshold to said storage node at the start and end of a second integration period longer than said first integration period, and reading a second voltage value at said storage node of each pixel in said row at the end of the second integration period;

controlling each pixel in a row of pixels to transfer charge accumulated in said photodiode to said storage node at the end of a third integration period longer than said first and second integration periods;

comparing, for each pixel in said row, said first voltage values with a reference voltage, the reference voltage determined by reading the storage node of each pixel in said row during said first integration period; and based on said comparison, for each pixel in said row, determining a pixel output value based on said first and/or second voltage values, if said comparison indicates that transfer of charge to said storage node occurred at the end of said first integration period; and reading a third voltage value at the end of said third integration period, and determining a pixel output value based on said second and/or third voltage values, if said comparison indicates that transfer of charge to said storage node did not occur at the end of said first integration period, wherein said first integration period starts and ends during said second integration period, wherein said second integration period starts and ends during said third integration period, and wherein the second threshold used at the start and end of said second integration period is lower than the first threshold used at the start and end of said first integration period.

2. The method of claim 1, wherein if said comparison indicates that charge was transferred from said photodiode to said storage node at the end of said first period, calculating said pixel output value as:

Pixel output value=MAX(($L1+L2$)×$GC$;$L1$×$GTC$)

where L1 is a value based on said first voltage value, L2 is a value based on said second voltage value, $G_C$ is a gain based on the ratio between the durations of said third and second integration periods, and $G_{TC}$ is a gain based on the ratio between the durations of said third and first integration periods.

3. The method of claim 1, wherein if said comparison indicates that charge was not transferred from said photodiode to said storage node at the end of said first period, calculating said pixel output value as:

Pixel output value=MAX($L3+L2$;$L2$×$G_C$)

where L3 is a value based on said third voltage value, L2 is a value based on said second voltage value, and $G_C$ is a gain value based on the ratio between the duration of said third and second integration periods.

4. The method of claim 1, wherein the voltage at said reference node is reset between the end of said second and third periods, but not between the ends of said first and second periods.

5. The method of claim 1, further comprising controlling each of said pixels in said row to read a first reference voltage at said storage node before the end of said first period, wherein said comparison comprises comparing said first reference voltage with said first voltage value.

6. The method of claim 1, wherein transferring said charge at the end of said first, second and third periods comprises applying respective first, second and third voltage pulses to the gate of a transistor coupled between said photodiode and said storage node, the amplitude said third voltage pulse being higher than the amplitude of said second voltage pulse, and the amplitude of said second voltage pulse being higher than the amplitude of said first voltage pulse.

7. The method of claim 6, wherein said first, second and third voltage pulses are triangular waves generated by charging and discharging a capacitance.

8. An image sensor comprising an array of pixels, each pixel comprising at least one photodiode connectable to a storage node, the image sensor further comprising:

row control circuitry arranged to control each pixel in a row of pixels to transfer charge accumulated in said photodiode above a first threshold to said storage node at the start and end of a first period comprising a first integration period, to transfer charge accumulated in said photodiode above a second threshold to said storage node at the start and end of a second period comprising a second integration period, said second integration period being longer than said first integration period, and to transfer charge accumulated in said photodiode to said storage node at the end of a third period comprising a third integration period longer than said first and second integration periods;

read circuitry arranged to read a first voltage value at said storage node of each pixel in said row at the end of the first period and to read a second voltage value at said storage node of each pixel in said row at the end of the second period;

a comparator arranged to compare, for each pixel in said row, the first voltage value with a reference voltage, the reference voltage determined by reading the storage node of each pixel in said row during said first integration period, and based on said comparison to control said read circuitry to read a third voltage value at said storage node of each pixel in said row at the end of the third period if said comparison indicates that transfer of charge to said storage node did not occur at the end of said first integration period; and pixel output generating circuitry arranged to determine a pixel output value based on said first and/or second voltage values if said third voltage value is not read by said read circuitry, or determine a pixel output value based on said second and/or third voltage values if said third voltage value is read by said read circuitry, wherein said first integration period starts and ends during said second integration period, wherein said second integration period starts and ends during said third integration period, and wherein the second threshold used at the start and end of said second integration period is lower than the first threshold used at the start and end of said first integration period.

9. The image sensor of claim 8, wherein said read circuitry comprises a first capacitor arranged to store said first voltage value, a second capacitor arranged to store said second voltage value, and a logic block arranged to over write said first voltage value in said first capacitor with said third voltage value based on an output of said comparator.

10. The image sensor of claim 8, wherein each pixel comprises a transistor coupled between said photodiode and said storage node, and wherein said row control circuitry is arranged to apply triangular voltage pulses to a gate of said transistor to control said charge transfers, the row control circuitry comprising pulse generating circuitry comprising a capacitor and arranged to generate said triangular voltage pulses.

11. A mobile telephone comprising an image memory, a display and the image sensor of claim 8.

12. A digital camera comprising a memory, a display, and the image sensor of claim 8.

* * * * *

UNITED STATES PATENT AND TRADEMARK OFFICE
CERTIFICATE OF CORRECTION

PATENT NO. : 8,253,090 B2  
APPLICATION NO. : 12/273164  
DATED : August 28, 2012  
INVENTOR(S) : Frédéric Barbier et al.

Page 1 of 1

It is certified that error appears in the above-identified patent and that said Letters Patent is hereby corrected as shown below:

Column 4, line 37, should read:
ating circuitry comprises a capacitor, and a switch control- Signed and Sealed this
Sixteenth Day of October, 2012

David J. Kappos
*Director of the United States Patent and Trademark Office*